(12) United States Patent
Watanabe (10) Patent No.: US 11,070,690 B2
(45) Date of Patent: Jul. 20, 2021

(54) IMAGE PROCESSING DEVICE AND NON-TRANSITORY COMPUTER READABLE MEDIUM

(71) Applicant: FUJIFILM Business Innovation Corp., Tokyo (JP)

(72) Inventor: Satoshi Watanabe, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 16/551,740

(22) Filed: Aug. 27, 2019

(65) Prior Publication Data

US 2020/0304662 A1    Sep. 24, 2020

(30) Foreign Application Priority Data

Mar. 20, 2019 (JP) .............................. JP2019-053076

(51) Int. Cl.
*H04N 1/00* (2006.01)
(52) U.S. Cl.
CPC ..... *H04N 1/00498* (2013.01); *H04N 1/00331* (2013.01); *H04N 1/00506* (2013.01)
(58) Field of Classification Search
CPC ........... H04N 1/00498; H04N 1/00331; H04N 1/00506

USPC ........................................ 358/1.13, 1.15, 1.9
See application file for complete search history.

(56) References Cited

U.S. PATENT DOCUMENTS

| 9,116,651 | B2 | 8/2015 | Ishii | |
|---|---|---|---|---|
| 10,003,709 | B1* | 6/2018 | Kato | .................. H04N 1/00938 |
| 2011/0302512 | A1* | 12/2011 | Ishii | ........................ G06F 9/454 |
| | | | | 715/760 |
| 2020/0036845 | A1* | 1/2020 | Kondo | ............... H04N 1/00411 |

FOREIGN PATENT DOCUMENTS

| JP | 2004318427 | 11/2004 |
|---|---|---|
| JP | 2011257945 | 12/2011 |
| JP | 2015016588 | 1/2015 |

\* cited by examiner

*Primary Examiner* — Quang N Vo
(74) *Attorney, Agent, or Firm* — JCIPRNET (57) ABSTRACT

An image processing device includes a reception unit, an acquisition unit, and a setting unit. The reception unit receives image data that is not associated with language information. The acquisition unit acquires language information from a result of analysis of the image data received by the reception unit. The setting unit sets a language displayed on a display, based on the language information acquired by the acquisition unit.

17 Claims, 9 Drawing Sheets

IMAGE PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-053076 filed Mar. 20, 2019.

BACKGROUND

(i) Technical Field

The present disclosure relates to an image processing device and a non-transitory computer readable medium.

(ii) Related Art

There has been known an image forming apparatus (see, for example, Japanese Unexamined Patent Application Publication No. 2004-318427) that is configured to be able to switch a language of a message displayed on a display unit, and includes: extracting means for extracting language specifying information used for specification of a language, the language specifying information being input along with a print job; and display control means for causing the message displayed on the display unit to be displayed in a language corresponding to the language specifying information.

Also, there has been known an image processing device (see, for example, Japanese Unexamined Patent Application Publication No. 2015-16588) that includes: transmitting means for transmitting an authentication request including user information; receiving means for receiving a notification of language information associated with the user information; and display control means for changing a display screen, based on the language information received by the receiving means.

Furthermore, there has been known an information transmission apparatus (see, for example, Japanese Unexamined Patent Application Publication No. 2011-257945) that includes: receiving means for receiving information indicating a display language type of a Web page to be displayed on a Web browser provided in an information processing apparatus; determining means for determining whether or not a display language type of a screen displayed on a display unit provided in the information transmission apparatus and the display language type indicated by the information received by the receiving means are the same; changing means for changing the display language type of the screen displayed on the display unit into the display language type indicated by the information received by the receiving means in a case where the display language type of the screen displayed on the display unit and the display language type indicated by the information received by the receiving means are not the same; generating means for generating a Web page including image data that indicates the same screen as the screen displayed on the display unit provided in the information transmission apparatus and indicates the screen of the display language type changed by the changing means; and transmitting means for transmitting the Web page generated by the generating means to the information processing apparatus.

SUMMARY

Aspects of non-limiting embodiments of the present disclosure relate to providing an image processing device that displays, based on image data not associated with language information, the image data in an appropriate language on a display unit on which an instruction necessary for processing the image data is displayed, without using a dedicated application or driver.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing device including a reception unit, an acquisition unit, and a setting unit. The reception unit receives image data that is not associated with language information. The acquisition unit acquires language information from a result of analysis of the image data received by the reception unit. The setting unit sets a language displayed on a display, based on the language information acquired by the acquisition unit.

BRIEF DESCRIPTION OF THE DRAWINGS

Exemplary embodiments of the present disclosure will be described in detail based on the following figures, wherein.

DETAILED DESCRIPTION

Hereinafter, exemplary embodiments of the present disclosure will be explained with reference to drawings. In each of the drawings, the same or equivalent components and parts will be assigned the same reference signs. For the sake of explanation, dimension ratios in the drawings are exaggerated and may be different from the actual ratios.

Figure 1:
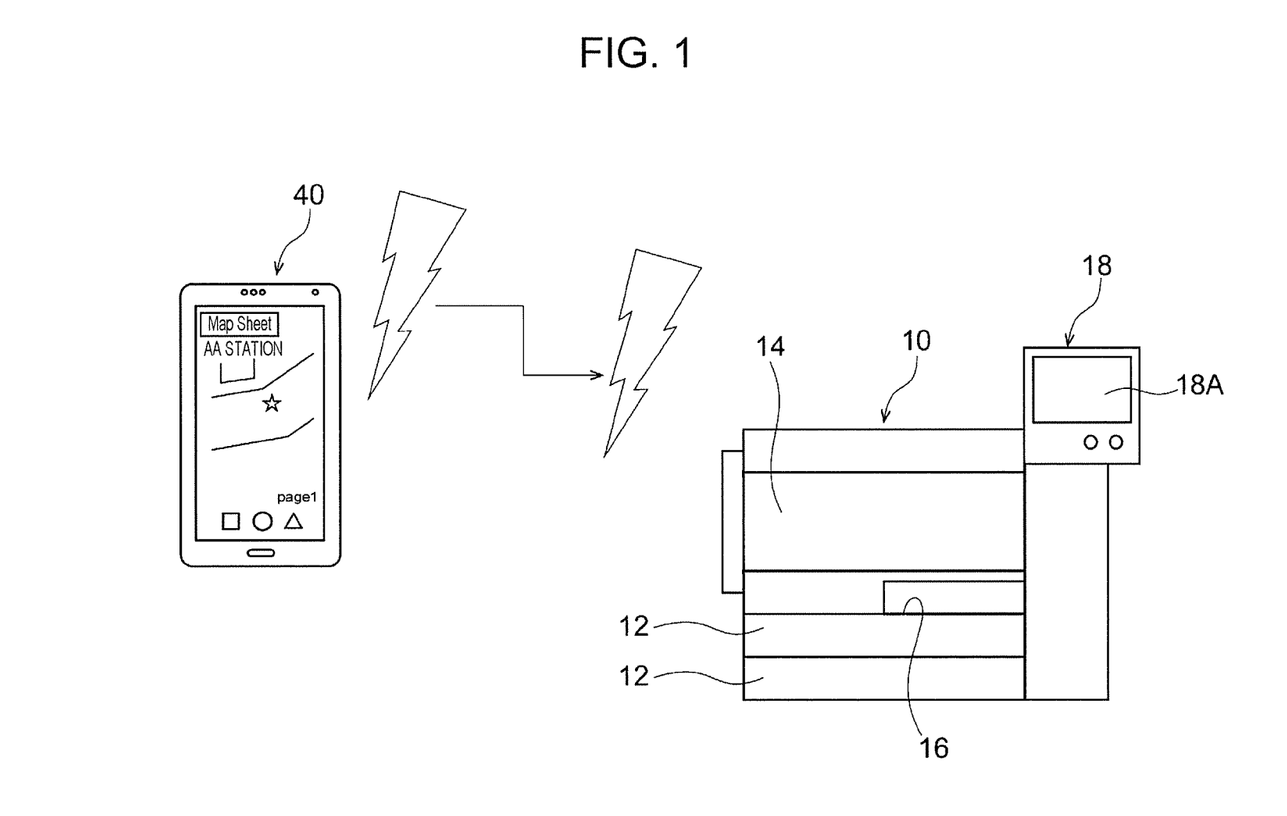
FIG. 1 is an explanatory diagram illustrating an image forming apparatus including an image processing device according to an exemplary embodiment built therein and a mobile terminal.

As illustrated in FIG. 1, an image processing device 20 according to an exemplary embodiment (see FIG. 4) is built in a well-known printer 10 as an example of an image forming apparatus arranged in a convenience store or the like. The printer 10 is capable of printing image data (images) transmitted from a mobile terminal 40 such as a smartphone on paper, using a function provided as standard equipment in the mobile terminal 40, via Wi-Fi®, Bluetooth®, or the like.

That is, the printer 10 includes a plurality of (in FIG. 1, two) accommodation units 12 in which sheets of paper of difference sizes are accommodated, an image forming unit 14 that forms and fixes toner images in color on paper conveyed from the accommodation units (prints images), and an ejection unit 16 that ejects paper on which the images are printed.

Figure 2:
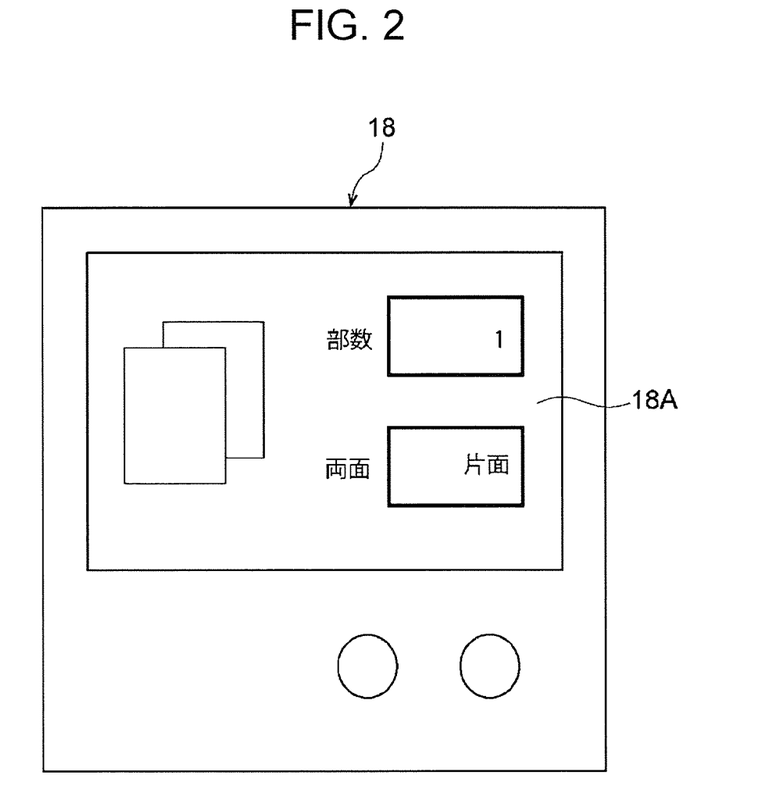
FIG. 2 is an enlarged front view illustrating a display unit of an image processing device according to an exemplary embodiment.
Figure 3:
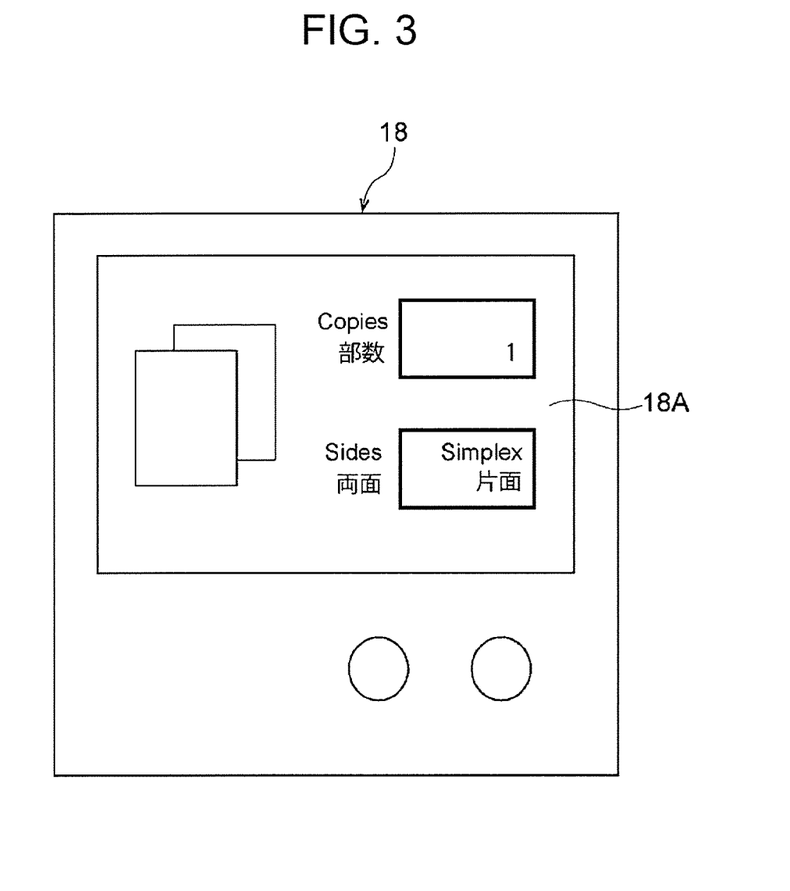
FIG. 3 is an enlarged front view of a display unit of an image processing device according to an exemplary embodiment.

As illustrated in FIGS. 1 to 3, the printer 10 includes a display unit 18 that displays operation contents of various types of information, such as the number of copies to be printed, single-sided printing, double-sided printing, paper size, and fee payment method, selected by a user before an image is printed.

The display unit 18 includes a liquid crystal display (hereinafter, referred to as a "display") 18A of a touch panel system on which various types of inputting may be performed for various types of displayed information in accordance with a touch operation by a user. Therefore, the display unit 18 (display 18A) is also an example of an input unit. A keyboard, buttons, and the like, which are not illustrated in FIG. 1, provided at the printer 10 may also be other examples of an input unit.

Figure 4:
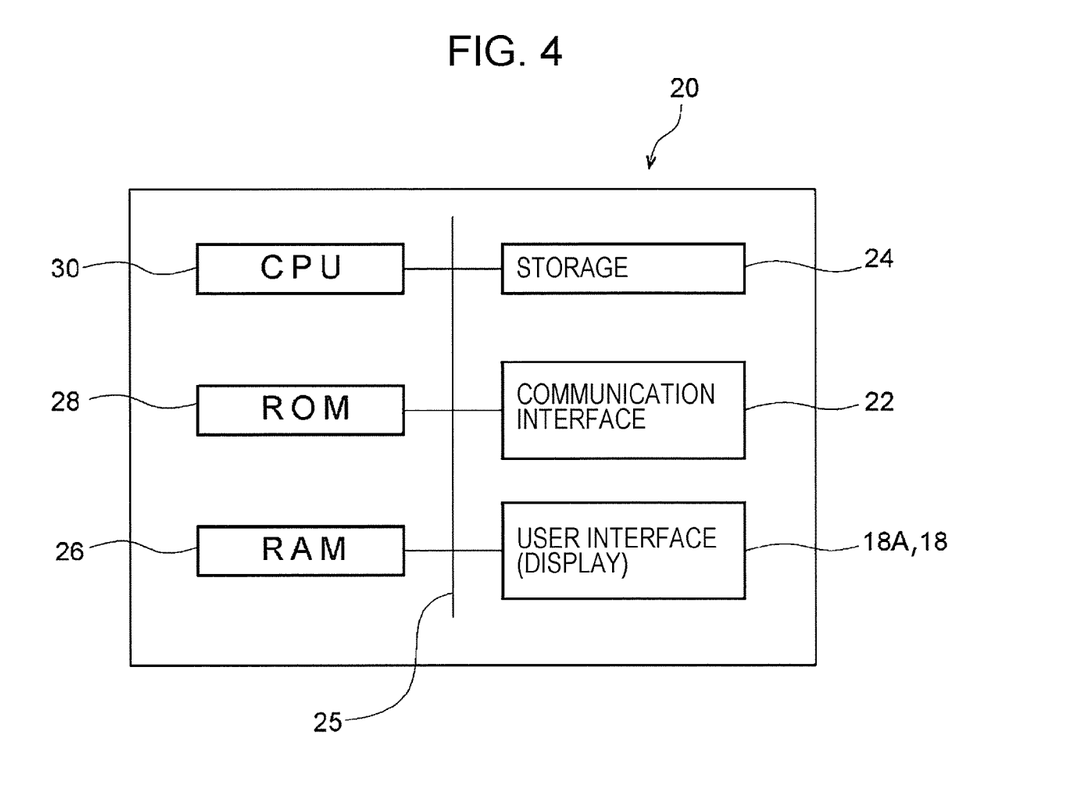
FIG. 4 is a block diagram illustrating a hardware configuration of an image processing device according to an exemplary embodiment.

As illustrated in FIG. 4, the image processing device 20 includes a central processing unit (CPU) 30, a read only memory (ROM) 28, a random access memory (RAM), 26, a storage 24, a communication interface 22, and a user interface, that is, the display unit 18 (display 18A) functioning as the input unit. These components are connected via a bus 25 such that they are able to communicate with one another.

The CPU 30 is a central processing unit. The CPU 30 executes various programs and controls the individual components. That is, the CPU 30 is configured to read a program from the ROM 28 or the storage 24 and executes the program using the RAM 26 as an operation region. The CPU 30 is also configured to perform control of each of the components mentioned above and various type of arithmetic processing in accordance with the program recorded in the ROM 28 or the storage 24. In an exemplary embodiment, an image processing program is stored in the ROM 28 or the storage 24.

The ROM 28 stores various programs and various data. As an operation region, the RAM 26 temporarily stores a program or data. The storage 24 includes a hard disk drive (HDD) or a solid state drive (SSD). Various programs including an operating system and various data are stored in the storage 24.

The communication interface 22 is an interface for communicating with other apparatuses such as the mobile terminal 40. For example, standards such as Ethernet®, FDDI, Wi-Fi, or Bluetooth are used for the communication interface 22.

In execution of the image processing program mentioned above, the image processing device 20 implements various functions using the hardware resources mentioned above. A functional configuration implemented by the image processing device 20 will be explained below.

Figure 5:
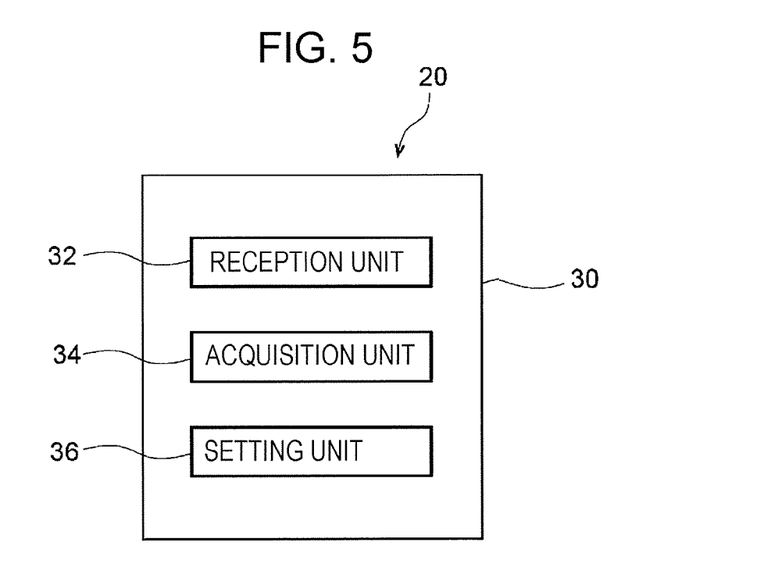
FIG. 5 is a block diagram illustrating a functional configuration of an image processing device according an exemplary embodiment.

As illustrated in FIG. 5, the image processing device 20 (CPU 30) includes, as a functional configuration, a reception unit 32, an acquisition unit 34, and a setting unit 36. The functional configuration is implemented when the CPU 30 reads and executes the image processing program stored in the ROM 28 or the storage 24.

The reception unit 32 receives image data (document) that is not associated with language information from the mobile terminal 40. The acquisition unit 34 acquires language information from a result of analysis of the image data received by the reception unit 32. The setting unit 36 sets a language to be displayed on the display 18A, based on the language information acquired by the acquisition unit 34.

More particularly, the acquisition unit 34 acquires language information based on a result of analysis of text data included in the image data (document) (including a result obtained by comparing appearance frequencies of character strings in the text data). However, in the case where no text data is included in the image data, the acquisition unit 34 acquires language information from an analysis result of character recognition processing (OCR processing) for the image data.

That is, in the case where there are characters in an image of image data, text/image separation processing is performed for the image data, OCR processing is performed for a portion that is determined to be text, and the portion is extracted as text data. Accordingly, even if no text data is included in image data, language information may be acquired. Analysis of image data may be performed by the image processing device 20 (acquisition unit 34) or may be performed via the cloud (server) or the like different from the image processing device 20.

Furthermore, in the case where a set language is the same as a default language displayed on the display 18A at a normal time, the setting unit 36 sets the default language. Accordingly, a language appropriate for the user is displayed on the display 18A. Furthermore, in the case where the display 18A is not provided with a function for displaying a set language, the setting unit 36 sets a language similar to the set language. Accordingly, a language that is able to be understood by the user is displayed on the display 18A.

Furthermore, in the case where a plurality of types of language information are acquired by the acquisition unit 34 (in the case where a unique principal language is not able to be determined), the setting unit 36 extracts and sets a priority language from among the plurality of types of language information acquired by the acquisition unit 34. Accordingly, a language appropriate for the user is displayed on the display 18A.

The priority language is extracted from fixed form data included in at least one of a header and a footer of image data (document). For example, the priority language is extracted from text data in the fixed form data, a page number including a character dependent on a language in the fixed form data, a date including a character dependent on a language in the fixed form data, or the like. Furthermore, in the case where a character dependent on a language is not included in the date in the fixed form data, a priority language is extracted from a language determined according to the order of arrangement of year, month, and date.

Furthermore, as illustrated in FIG. 3, the setting unit 36 may be configured to perform setting such that both a priority language and a default language are displayed. Furthermore, the setting unit 36 may be configured to perform setting such that both a priority language and a language similar to the priority language (for example, Chinese written using simplified characters and Chinese written using traditional characters) are displayed. Accordingly, a language that is able to be understood by the user is displayed on the display 18A.

Furthermore, the setting unit 36 may be configured to extract, as a non-priority language, a language that is determined to be most likely to be a principal language (language to be set) from among the plurality of types of language information acquired by the acquisition unit 34 and set only the non-priority language or to perform setting such that both the non-priority language and a default language are displayed, in the case where a priority language is not able to be extracted. Accordingly, a language that is able to be understood by the user is displayed on the display 18A.

It is desirable that the setting unit 36 be configured to perform setting such that a priority language (or a non-priority language) is displayed in an upper tier. Accordingly, compared to a case where a priority language (or a non-priority language) is displayed in a lower tier, the user is able to read the priority language (or the non-priority language) easily.

Furthermore, the setting unit 36 may be configured to perform setting such that a language that is determined to be most likely to be a principal language (language to be set) from among a plurality of types of language information acquired by the acquisition unit 34 is set as a first priority language, a language that is determined to be second most likely to be the principal language is set as a second priority language, and both the first priority language and the second priority language are displayed, in the case where a priority language is not able to be extracted. Accordingly, a language that is able to be understood by the user is displayed on the display 18A.

Furthermore, the image processing device 20 is configured such that, even if image data is transmitted from the mobile terminal 40 to the printer 10, display of the display 18A is not switched when another user is printing at the printer 10. Furthermore, the image processing device 20 is configured such that display of the display 18A is switched only when presence of the mobile terminal 40 that has transmitted image data (document) by short-distance communication such as Bluetooth is detected.

Operations of the image processing device 20 configured as described above according to exemplary embodiments will be explained below. When the CPU 30 reads an image processing program from the ROM 28 or the storage 24, loads the image processing program onto the RAM 26, and executes the image processing program, desired language display (image processing) described below is automatically performed.

When the user causes the mobile terminal 40 to transmit image data to the printer 10 (see FIG. 1), the CPU 30 in the image processing device 20 in the printer 10 causes the reception unit 32 to receive the image data. The image data received at this time is image data (document) that is not associated with language information (that does not explicitly specify a language) and, for example, image data such as a map in which Japanese characters such as "AA Station" are written, as illustrated in FIG. 1.

First Exemplary Embodiment

Figure 6:
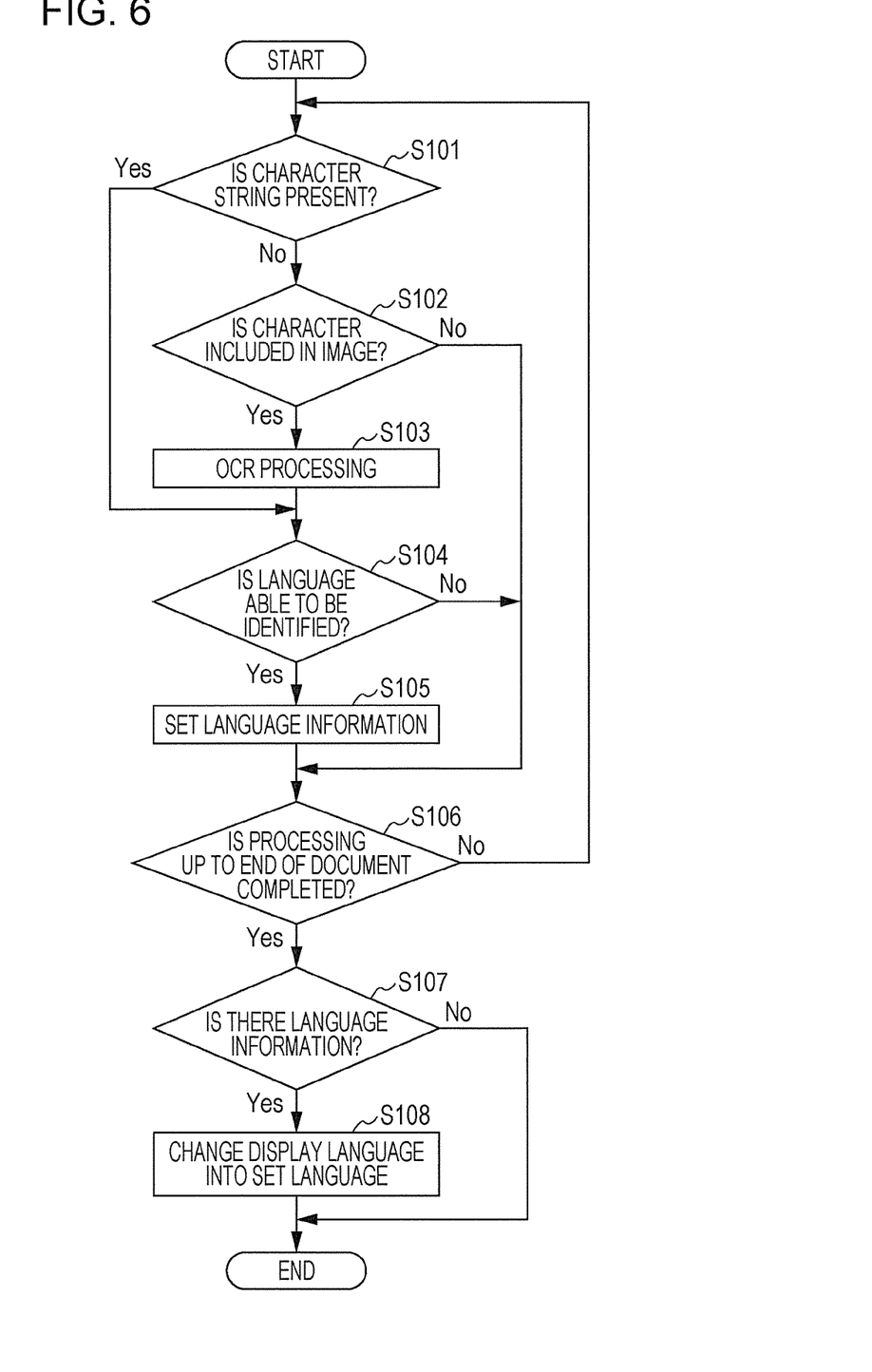
FIG. 6 is a flowchart illustrating an operation of an image processing device according to a first exemplary embodiment.

First, a first exemplary embodiment will be explained. When the reception unit 32 receives image data, the CPU 30 causes the acquisition unit 34 (or via the cloud) to analyze the image data. That is, as illustrated in FIG. 6, the CPU 30 determines, based on dictionary analysis or artificial intelligence (AI) analysis, whether or not text data (a character string to be printed and a character string not to be printed) is included in the image data (step S101).

In the case where no text data is included in the image data, the CPU 30 determines whether or not an image of the image data includes a character (step S102). In the case where the image of the image data includes a character, the CPU 30 performs text/image separation processing for the image data, performs OCR processing for a portion that is determined to be text, and extracts the portion as text data (step S103).

In the case where the image of the image data includes text data or text data is extracted, the CPU 30 determines whether or not language information is able to be acquired (identified) from the text data (step S104). Then, in the case where a principal language is able to be acquired (identified) from the language information, the CPU 30 causes the setting unit 36 to temporarily set the principal language (step S105). Then, the CPU 30 performs the above processing up to the end of the image data (document) (up to the end of the final page if there are a plurality of pages) (step S106).

As described above, with a configuration in which the acquisition unit 34 acquires language information from a result of analysis of text data included in the image data (or extracted from the image data), compared to the case where language information is acquired from a result of analysis of data other than text data included in the image data, the language information may be acquired easily.

When the processing up to the end of the image data (document) is completed, the CPU 30 causes the setting unit 36 to determine whether or not there is a principal language (step S107). That is, the CPU 30 determines whether or not a unique principal language is able to be set. In the case where a unique principal language is able to be set, the CPU 30 determines that the principal language is a language desired by a user. Then, for example, as illustrated in FIG. 2, the CPU 30 displays the language (Japanese in FIG. 2) on the display 18A (step S108).

As described above, only by transmitting image data that is not associated with language information (based on the image data), an instruction necessary for processing the image data is automatically displayed on the display 18A in an appropriate language desired by the user, without using a dedicated application or driver.

Specifically, in the case where a traveler or the like from overseas wishes to print an image using the printer 10 arranged in a convenience store or the like, he or she may not be able to print (may not be able to perform settings for the number of copies to be printed, double-sided printing, etc. and make payment of the fee) because he or she is not able to read a default language displayed on the display 18A of the printer 10. Furthermore, even if he or she wishes to switch a language displayed, he or she may not be able to read a language indicating an instruction for switching, and the display may be maintained in the language that is not able to be understood by him or her.

However, in this exemplary embodiment, only by transmitting image data that is not associated with language information to the printer 10, a language displayed on the display 18A of the printer 10 is switched to a language used by a user (traveler or the like) automatically (without requiring the user to operate an input unit of the printer 10). Thus, the traveler or the like from overseas is also able to print an image using the printer 10 arranged in a convenience store or the like.

In the case where a default language for the image processing device 20 is Japanese and it is determined that a principal language is, for example, English, not only English but also both English and Japanese may be displayed (in two tiers) on the display 18A, as illustrated in FIG. 3. Furthermore, in this case, it is desirable that English, which is the principal language, be displayed on the upper tier.

Furthermore, in the case where it is determined that the default language for the image processing device 20 is the same as the principal language, only the default language is displayed on the display 18A. In other words, in this case, the default language and the principal language are not displayed in two tiers.

Furthermore, in the case where the principal language is not able to be displayed on the display 18A, a language close to (similar to) the principal language is displayed on the display 18A. For example, in the case where Chinese with "simplified characters" is not able to be displayed but Chinese with "traditional characters" is able to be displayed on the display 18A, Chinese with "traditional characters" is displayed on the display 18A.

Furthermore, in the case where languages are displayed in two tiers, both the principal language and the language close to (similar to) the principal language may be displayed. For example, Chinese written using "simplified characters" may be displayed as the principal language on the upper tier and Chinese written using "traditional characters" may be displayed as the language close to the principal language on the lower tier.

Second Exemplary Embodiment

Next, a second exemplary embodiment will be explained. Explanation for the same operation as that in the first exemplary embodiment will be omitted in an appropriate manner. Furthermore, in the second exemplary embodiment, explanation for a step of extracting text data in OCR processing will be omitted.

Figure 7:
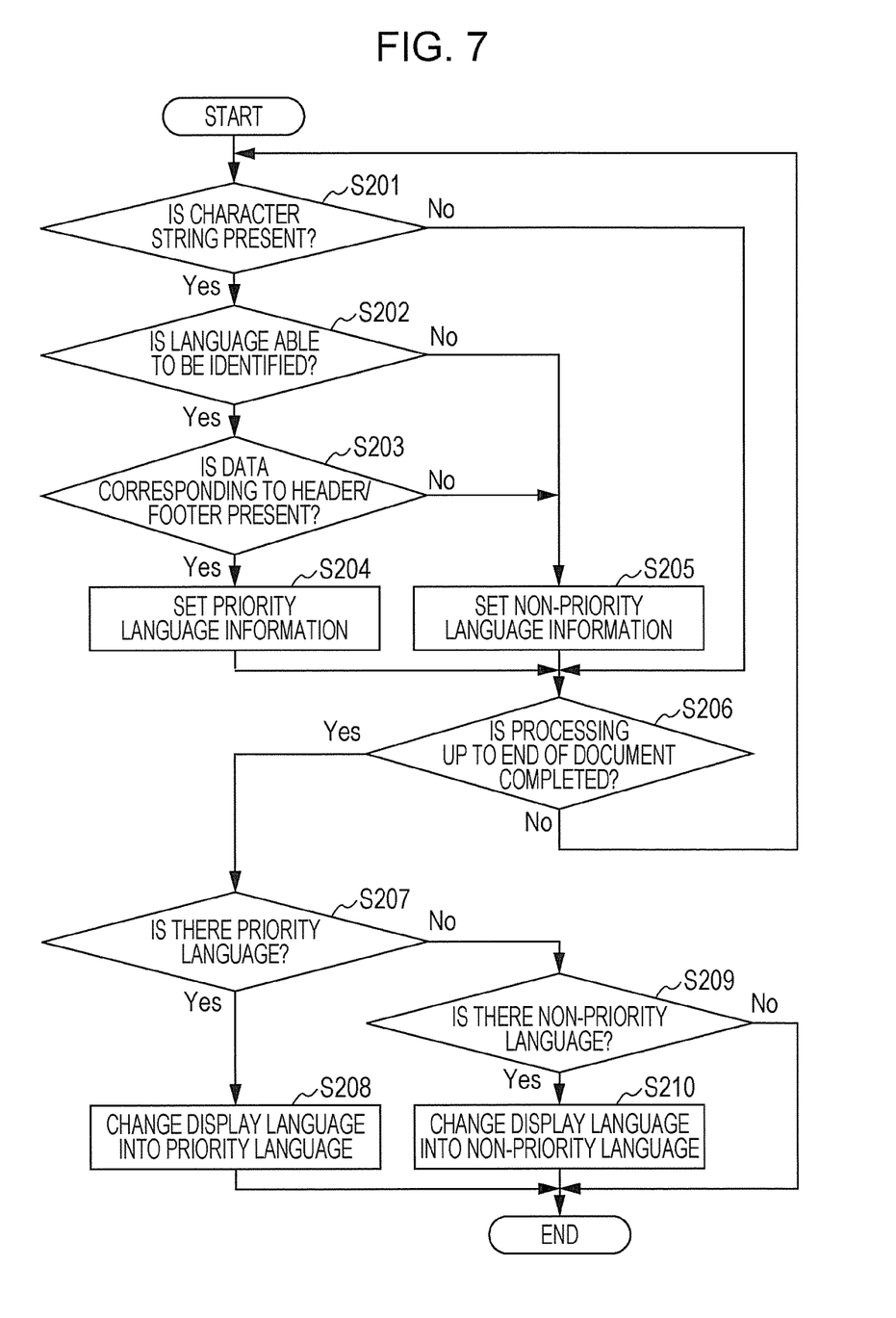
FIG. 7 is a flowchart illustrating an operation of an image processing device according to a second exemplary embodiment.

When the reception unit 32 receives image data, the CPU 30 causes the acquisition unit 34 (or via the cloud) to analyze the image data. That is, as illustrated in FIG. 7, the CPU 30 determines, based on dictionary analysis or AI analysis, whether or not text data (a character string to be printed and a character string not to be printed) is included in the image data (step S201).

In the case where text data is included in the image data, the CPU 30 determines whether or not language information is able to be acquired (identified) from the text data (step S202). In the case where the CPU 30 is not able to uniquely determine a principal language from among a plurality of types of language information acquired by the acquisition unit 34, the CPU 30 determines whether or not fixed form data is present in at least one of an upper end and a lower end, which are a header and a footer, respectively, of each page of a document (step S203).

In the case where fixed form data is present, if language information is able to be acquired (identified) from a portion except for a page number and date of the fixed form data, the CPU 30 temporarily sets the language acquired from the fixed form data (for example, "Map sheet") as a priority language (step S204).

In the case where no fixed form data is present, the CPU 30 causes the setting unit 36 to temporarily set the language that is most likely to be a principal language, from among the plurality of types of language information, as a non-priority language (step S205). Then, the CPU 30 performs the above processing up to the end of the image data (document) (up to the end of the final page if there are a plurality of pages) (step S206).

When the processing up to the end of the image data (document) is completed, the CPU 30 causes the setting unit 36 to determine whether or not there is a priority language (step S207). In the case where there is a priority language, the CPU 30 causes the setting unit 36 to set the priority language. That is, the CPU 30 determines that the priority language is a language desired by a user. Then, the CPU 30 displays the priority language on the display 18A (step S208).

In the case where there is no priority language, the CPU 30 determines whether or not there is a non-priority language (step S209). In the case where there is a non-priority language, the CPU 30 causes the setting unit 36 to set the non-priority language. That is, the CPU 30 determines that the non-priority language is a language desired by the user. Then, the CPU 30 displays the non-priority language on the display 18A (step S210).

Third Exemplary Embodiment

Next, a third exemplary embodiment will be explained. Explanation for the same operation as that in the first exemplary embodiment will be omitted in an appropriate manner. Furthermore, in the third exemplary embodiment, explanation for a step of extracting text data in OCR processing will be omitted.

Figure 8:
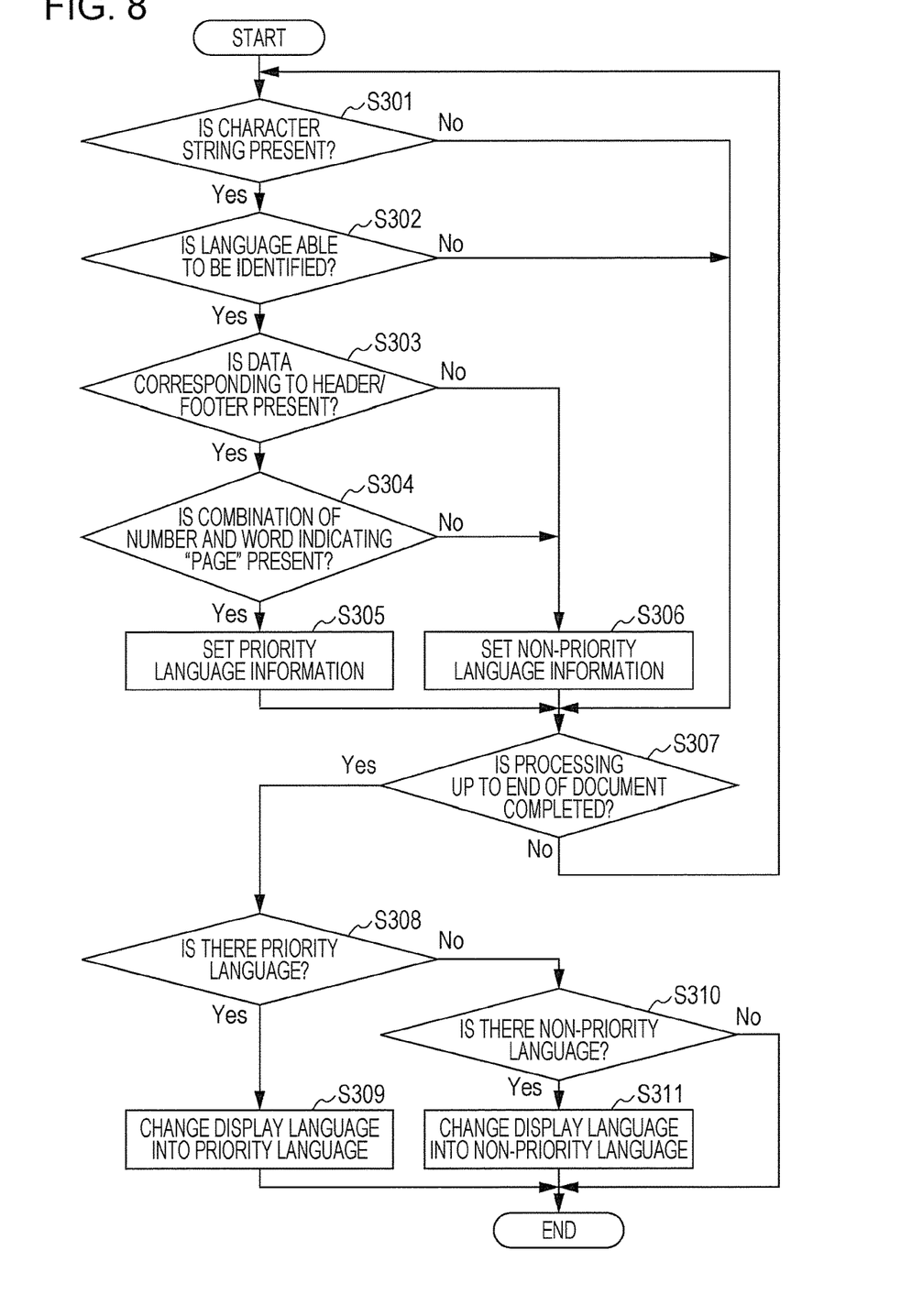
FIG. 8 is a flowchart illustrating an operation of an image processing device according to a third exemplary embodiment.

When the reception unit 32 receives image data, the CPU 30 causes the acquisition unit 34 (or via the cloud) to analyze the image data. That is, as illustrated in FIG. 8, the CPU 30 determines, based on dictionary analysis or AI analysis, whether or not text data (a character string to be printed and a character string not to be printed) is included in the image data (step S301).

In the case where text data is included in the image data, the CPU 30 determines whether or not language information is able to be acquired (identified) from the text data (step S302). In the case where the CPU 30 is not able to uniquely determine a principal language from among a plurality of types of language information acquired by the acquisition unit 34, the CPU 30 determines whether or not fixed form data is present in at least one of an upper end and a lower end, which are a header and a footer, respectively, of each page of a document (step S303).

In the case where fixed form data is present and language information is not able to be acquired from a portion except for a page number and date of the fixed form data but a character dependent on a language is used for the page number of the fixed form data, the CPU 30 determines whether or not language information is able to be acquired (identified) from the fixed form data (page number) (step S304). In the case where language information is able to be acquired (identified) from the fixed form data (page number), the CPU 30 causes the setting unit 36 to temporarily set the language acquired from the fixed form data (for example, page 1) as a priority language (step S305).

In the case where no fixed form data is present or a character dependent on a language is not used for the page number, the CPU 30 temporarily sets the language that is most likely to be a principal language, from among the plurality of types of language information, as a non-priority language (step S306). Then, the CPU 30 performs the above processing up to the end of the image data (document) (up to the end of the final page if there are a plurality of pages) (step S307).

When the processing up to the end of the image data (document) is completed, the CPU 30 causes the setting unit 36 to determine whether or not there is a priority language (step S308). In the case where there is a priority language, the CPU 30 causes the setting unit 36 to set the priority language. That is, the CPU 30 determines that the priority language is a language desired by a user. Then, the CPU 30 displays the priority language on the display 18A (step S309).

In the case where there is no priority language, the CPU 30 determines whether or not there is a non-priority language (step S310). In the case where there is a non-priority language, the CPU 30 causes the setting unit 36 to set the non-priority language. That is, the CPU 30 determines that the non-priority language is a language desired by the user. Then, the CPU 30 displays the non-priority language on the display 18A (step S311).

Fourth Exemplary Embodiment

Next, a fourth exemplary embodiment will be explained. Explanation for the same operation as that in the first exemplary embodiment will be omitted in an appropriate manner. Furthermore, in the fourth exemplary embodiment, explanation for a step of extracting text data in OCR processing will be omitted.

Figure 9:
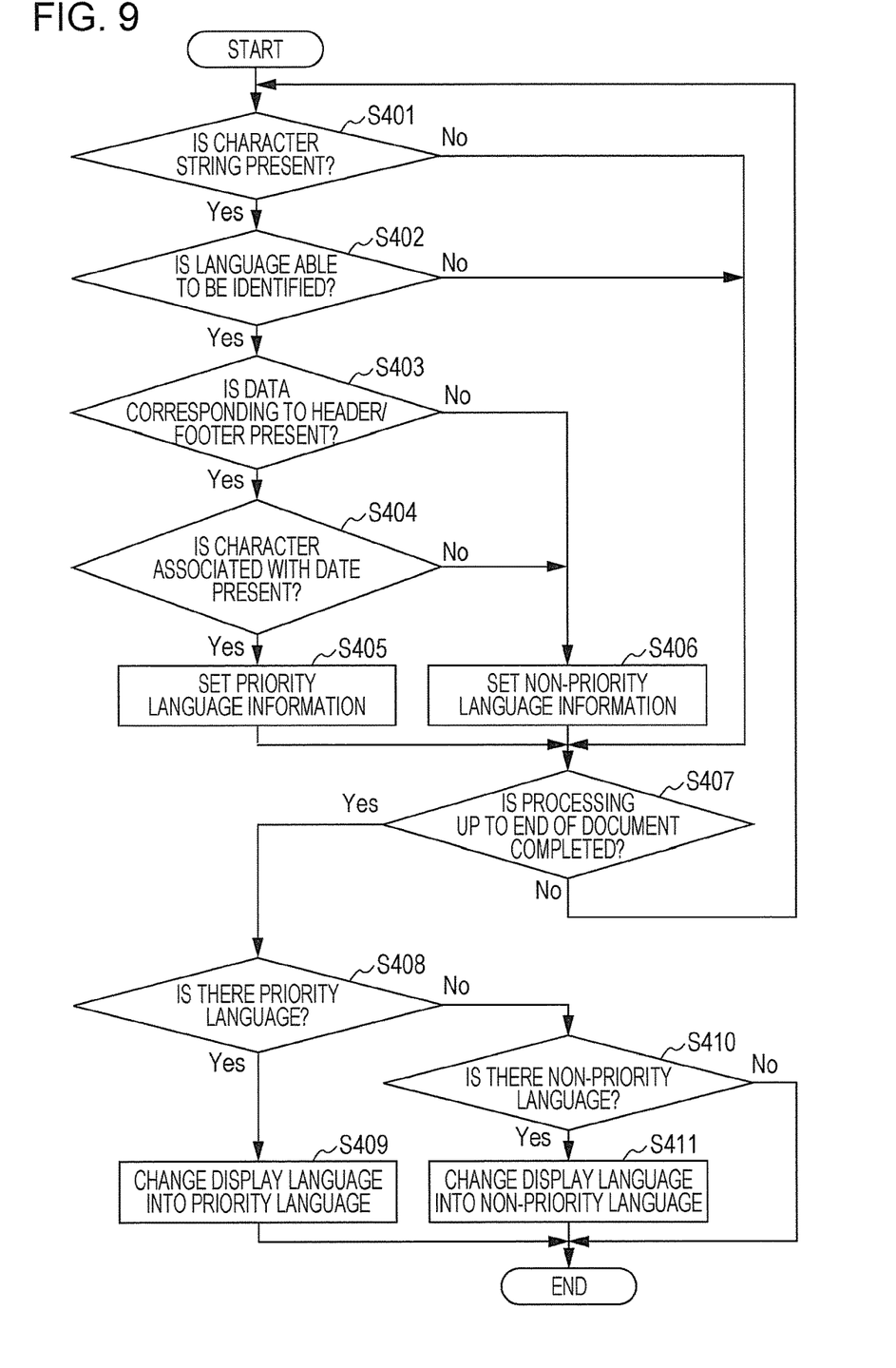
FIG. 9 is a flowchart illustrating an operation of an image processing device according to a fourth exemplary embodiment.

When the reception unit 32 receives image data, the CPU 30 causes the acquisition unit 34 (or via the cloud) to analyze the image data. That is, as illustrated in FIG. 9, the CPU 30 determines, based on dictionary analysis or AI analysis, whether or not text data (a character string to be printed and a character string not to be printed) is included in the image data (step S401).

In the case where text data is included in the image data, the CPU 30 determines whether or not language information is able to be acquired (identified) from the text data (step S402). In the case where the CPU 30 is not able to uniquely determine a principal language from among a plurality of types of language information acquired by the acquisition unit 34, the CPU 30 determines whether or not fixed form data is present in at least one of an upper end and a lower end, which are a header and a footer, respectively, of each page of a document (step S403).

In the case where fixed form data is present and language information is not able to be acquired from a portion except for a page number and date of the fixed form data but a character dependent on a language is used for the date of the fixed form data, the CPU 30 determines whether or not language information is able to be acquired (identified) from the fixed form data (date) (step S404). In the case where language information is able to be acquired (identified) from the fixed form data (date), the CPU 30 causes the setting unit 36 to temporarily set the language acquired from the fixed form data (for example, "April") as a priority language (step S405).

In the case where no fixed form data is present or a character dependent on a language is not used for the date, the CPU 30 temporarily sets the language that is most likely to be a principal language, from among the plurality of types of language information, as a non-priority language (step S406). Then, the CPU 30 performs the above processing up to the end of the image data (document) (up to the end of the final page if there are a plurality of pages) (step S407).

When the processing up to the end of the image data (document) is completed, the CPU 30 causes the setting unit 36 to determine whether or not there is a priority language (step S408). In the case where there is a priority language, the CPU 30 causes the setting unit 36 to set the priority language. That is, the CPU 30 determines that the priority language is a language desired by a user. Then, the CPU 30 displays the priority language on the display 18A (step S409).

In the case where there is no priority language, the CPU 30 determines whether or not there is a non-priority language (step S410). In the case where there is a non-priority language, the CPU 30 causes the setting unit 36 to set the non-priority language. That is, the CPU 30 determines that the non-priority language is a language desired by the user. Then, the CPU 30 displays the non-priority language on the display 18A (step S411).

Fifth Exemplary Embodiment

Finally, a fifth exemplary embodiment will be explained. Explanation for the same operation as that in the first exemplary embodiment will be omitted in an appropriate manner. Furthermore, in the fifth exemplary embodiment, explanation for a step of extracting text data in OCR processing will be omitted.

Figure 10:
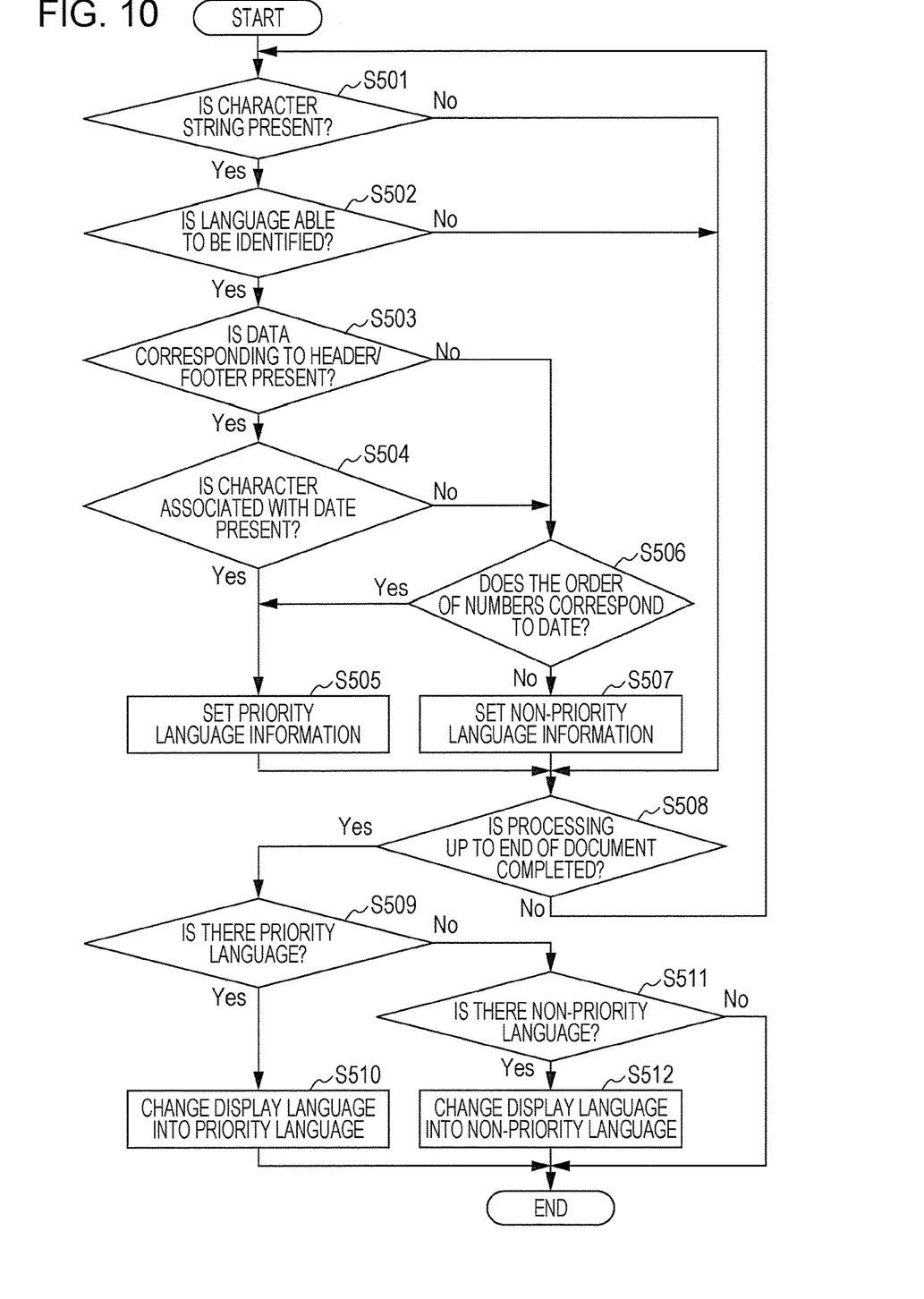
FIG. 10 is a flowchart illustrating an operation of an image processing device according to a fifth exemplary embodiment.

When the reception unit 32 receives image data, the CPU 30 causes the acquisition unit 34 (or via the cloud) to analyze the image data. That is, as illustrated in FIG. 10, the CPU 30 determines, based on dictionary analysis or AI analysis, whether or not text data (a character string to be printed and a character string not to be printed) is included in the image data (step S501).

In the case where text data is included in the image data, the CPU 30 determines whether or not language information is able to be acquired (identified) from the text data (step S502). In the case where the CPU 30 is not able to uniquely determine a principal language from among a plurality of types of language information acquired by the acquisition unit 34, the CPU 30 determines whether or not fixed form data is present in at least one of an upper end and a lower end, which are a header and a footer, respectively, of each page of a document (step S503).

In the case where fixed form data is present and language information is not able to be acquired from a portion except for a page number and date of the fixed form data but a character dependent on a language is used for the date of the fixed form data, the CPU 30 determines whether or not language information is able to be acquired (identified) from the fixed form data (date) (step S504). In the case where language information is able to be acquired (identified) from the fixed form data (date), the CPU 30 causes the setting unit 36 to temporarily set the language acquired from the fixed form data (for example, "April") as a priority language (step S505).

In the case where no fixed form data is present or a character dependent on a language is not used for the date, the CPU 30 determines whether or not language information is able to be acquired (identified) from the order of arrangement of the date (step S506). Then, in the case where language information is able to be acquired (identified) from the order of arrangement of the date, the CPU 30 temporarily sets the language acquired from the fixed form data (for example, "1 Apr., 2019") as a priority language (step S505).

Furthermore, in the case where language information is not able to be acquired from the order of arrangement of the date, the CPU 30 temporarily sets the language that is most likely to be a principal language, from among the plurality of types of language information, as a non-priority language (step S507). Then, the CPU 30 performs the above processing up to the end of the image data (document) (up to the end of the final page if there are a plurality of pages) (step S508).

When the processing up to the end of the image data (document) is completed, the CPU 30 causes the setting unit 36 to determine whether or not there is a priority language (step S509). In the case where there is a priority language, the CPU 30 causes the setting unit 36 to set the priority language. That is, the CPU 30 determines that the priority language is a language desired by a user. Then, the CPU 30 displays the priority language on the display 18A (step S510).

In the case where there is no priority language, the CPU 30 determines whether or not there is a non-priority language (step S511). In the case where there is a non-priority language, the CPU 30 causes the setting unit 36 to set the non-priority language. That is, the CPU 30 determines that the non-priority language is a language desired by the user. Then, the CPU 30 displays the non-priority language on the display 18A (step S512).

Exemplary embodiments have been described above. However, the image processing device 20 according to an exemplary embodiment may be configured not to start analysis of image data until a predetermined time has passed since transmission of the image data from the mobile terminal 40 to the printer 10. With this configuration, users who wish to select various types of information in a default language, not in a language extracted from image data, may also be supported.

In the case where the CPU 30 is not able to set the language that is most likely to be a principal language as a non-priority language, a plurality of languages that are likely to be a principal language may be displayed on the display 18A, so that a user is able to select a non-priority language (understandable language) from among the displayed languages.

The image processing device 20 according to exemplary embodiments has been explained above. However, the image processing device 20 according to exemplary embodiments are not limited to the foregoing exemplary embodiments. Various improvements and modifications may be made without departing from the scope of the present disclosure. For example, image data is not necessarily transmitted from the mobile terminal 40 to the printer 10. Image data may be transmitted from a notebook personal computer, which is not illustrated in the drawings, to the printer 10.

Furthermore, in the foregoing exemplary embodiments, processing executed when the CPU 30 reads software (program) may be executed by various processors other than the CPU 30. In this case, the processors may be a programmable logic device (PLD) whose circuit configuration may be changed after it is manufactured, such as a field-programmable gate array (FPGA), and a dedicated electric circuit, which is a processor including a circuit configuration designed dedicated to execution of specific processing, such as an application specific integrated circuit (ASIC), and the like.

Furthermore, image processing may be executed by one of the various processors or may be executed by a combination of two or more processors of the same type or different types (for example, a combination of a plurality of FPGAs, a combination of a CPU and an FPGA, etc.). Furthermore, a hardware structure of the various processors is, more specifically, an electric circuit in which circuit elements such as semiconductor elements are combined.

Furthermore, although an aspect in which an image processing program is stored (installed) in advance in the ROM 28 or the storage 24 is explained in each of the foregoing exemplary embodiments. However, the present disclosure is not limited to this aspect. The program may be recorded in a recording medium such as a compact disk read only memory (CD-ROM), a digital versatile disk read only memory (DVD-ROM), or a universal serial bus (USB) memory and provided. Furthermore, the program may be downloaded from an external apparatus via a network.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing device of an image forming apparatus, the image processing device comprising:
    a reception unit that receives image data to be printed by the image forming apparatus that is acquired from outside the image processing device;
    an acquisition unit that analyzes the image data to acquire the language information from a result of analysis of the image data wherein in response to determining that the image data include text data, the acquisition unit is configured to extract an image portion that includes the text data from the image data, perform a character recognition processing to extracted image portion to acquire the text data included in the image data, and identify the language information according to the acquired text data; and
    a setting unit that sets a display language displayed on a display, based on the language information acquired by the acquisition unit,
    wherein in response to determining that a principal language is acquired from the language information, the setting unit is configured to set the principal language as the display language displayed on the display, and
    in response to determining that the principal language is not supported by the display, the setting unit is configured to set a language that is similar to the principal language as the display language.

2. The image processing device according to claim 1, wherein in a case where the set display language is the same as a default language, the setting unit sets the default language.

3. The image processing device according to claim 1, wherein in a case where a plurality of types of language information are acquired by the acquisition unit, the setting unit extracts a priority language from the plurality of types of language information acquired by the acquisition unit and sets the extracted priority language.

4. The image processing device according to claim 3, wherein the priority language is extracted from fixed form data included in at least one of a header and a footer.

5. The image processing device according to claim 3, wherein the priority language is extracted from a page number including a character dependent on the language.

6. The image processing device according to claim 3, wherein the priority language is extracted from a date including a character dependent on the language.

7. The image processing device according to claim 6, wherein in the case where the character dependent on the language is not included in the date, the priority language is extracted from the language determined based on an order of arrangement of year, month, and date.

8. The image processing device according to claim 3, wherein the setting unit performs setting such that both the priority language and a default language are displayed.

9. The image processing device according to claim 3, wherein the setting unit performs setting such that both the priority language and the language similar to the priority language are displayed.

10. The image processing device according to claim 3, wherein in the case where the setting unit is not able to extract the priority language, the setting unit extracts the language that is determined to be most likely to be the language to be set, from among the plurality of types of language information acquired by acquisition unit, as a non-priority language, and sets only the non-priority language or performs setting such that both the non-priority language and a default language are displayed.

11. The image processing device according to claim 3, wherein in the case where the setting unit is not able to extract the priority language, the setting unit defines the language that is determined to be most likely to be the language to be set, from among the plurality of types of language information acquired by the acquisition unit, as a first priority language and the language that is determined to be second most likely to be the language to be set as a second priority language, and performs setting such that both the first priority language and the second priority language are displayed.

12. The image processing device according to claim 8, wherein the setting unit performs setting such that the priority language is displayed on an upper tier.

13. The image processing device according to claim 1, wherein
   the image processing device is configured to detect a presence of a device that has transmitted the image data to the image processing device, and
   the setting unit is configured to set the language displayed on the display when the presence of the device that has transmitted the image data is detected.

14. An image processing method comprising:
   receiving image data to be printed that is acquired from outside;
   analyzing the image data to acquire the language information from a result of analysis of the image data;
   in response to determining that the image data include text data, extracting an image portion that includes the text data from the image data, performing a character recognition processing to extracted image portion to acquire the text data included in the image data, and identifying the language information according to the acquired text data;
   setting a display language displayed on a display, based on the language information;
   in response to determining that a principal language is acquired from the language information, setting the principal language as the display language displayed on the display, and
   in response to determining that the principal language is not supported by the display, setting a language that is similar to the principal language as the display language.

15. The image processing method according to claim 14, further comprising:
   detecting a presence of a device that has transmitted the image data,
   wherein the language displayed on the display is set when the presence of the device that has transmitted the image data is detected.

16. A non-transitory computer readable medium storing a program causing a computer to execute a process for image processing, the process comprising:
   receiving image data to be printed that is acquired from outside and is not associated with language information, wherein the image data is configured to be printed;
   analyzing the image data to acquire the language information from a result of analysis of the received image data;
   in response to determining that the image data include text data, extracting an image portion that includes the text data from the image data, performing a character recognition processing to extracted image portion to acquire the text data included in the image data, and identifying the language information according to the acquired text data;
   setting a display language displayed on a display, based on the acquired language information;
   in response to determining that a principal language is acquired from the language information, setting the principal language as the display language displayed on the display, and
   in response to determining that the principal language is not supported by the display, setting a language that is similar to the principal language as the display language.

17. The non-transitory computer readable medium according to claim 16, wherein the process further comprising:
   detecting a presence of a device that has transmitted the image data,
   wherein the language displayed on the display is set when the presence of the device that has transmitted the image data is detected.

* * * * *